Patented Oct. 21, 1941

2,259,721

UNITED STATES PATENT OFFICE 2,259,721

SULPHONYL CYANAMIDES

George W. Anderson, Stamford, and Richard O. Roblin, Jr., Old Greenwich, Conn., assignors to American Cyanamid Company, New York, N. Y., a corporation of Maine No Drawing. Application November 19, 1940, Serial No. 366,274

2 Claims. (Cl. 260—397.7)

This invention relates to p-substituted benzene sulphonyl cyanamides and more particularly to p-nitro benzene sulphonyl cyanamide.

In the past a number of sulphonamido compounds have been prepared by the reaction of various benzene sulphonyl halides with amines, the basic amino group reacting with the halide to produce a sulphonamido compound. We have found that in spite of the fact that the amido group in cyanamide is definitely acidic, forming stable salts with sodium, calcium, and the like, nevertheless it is possible to prepare sulphonyl compounds therefrom.

According to the present invention a p-nitrobenzene sulphonyl halide such as the chloride or bromide is reacted with free cyanamide, preferably in the presence of an acid-binding agent and p-nitrobenzene sulphonyl cyanamide is obtained, or in the case of strong acid-binding agents, such as sodium hydroxide, the sodium salt thereof. This compound can be readily reduced to the amino compound which can be obtained in the free state. The products are useful as dyestuff intermediates and the amino compound shows low toxicity when introduced into the blood stream of animals.

The invention will be described in greater detail in conjunction with the following specific example which is a typical illustration but it should be understood that the invention is not limited to the exact details therein set forth. The parts are by weight.

EXAMPLE

*Sodium-p-nitrobenzenesulphonylcyanamide*

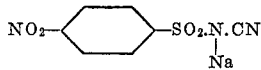

33 parts of cyanamide are added to a solution of 61 parts of sodium hydroxide in 200 parts of water. To this are added 167 parts of p-nitrobenzenesulphonyl chloride in portions with stirring so that the temperature does not rise above 45° C. The reaction mixture is diluted with 100 parts of water, chilled, and filtered. The solid so obtained is purified by recrystallization from water and by precipitating from an acetone solution with petroleum ether.

The purified sodium p-nitrobenzene sulphonyl cyanamide melts with decomposition at about 286–288° C.

The hydrogen of the sulphonamido group is strongly acidic and reacts in general to form salts with almost any metal. Thus, for example, if in the production of the nitro compound the sodium hydroxide is replaced by potassium hydroxide, calcium hydroxide, and the like, the corresponding salts can be prepared. From the alkali metal salts of either the nitro compounds other metal salts can be prepared by double decomposition. For example, the copper salt can be prepared by reacting the sodium salt of the nitrobenzene sulphonyl cyanamide or sulphanilyl cyanamide with cupric chloride or other cupric salt and in a similar manner the silver salt can be prepared by using silver nitrate.

We claim:

1. p-Nitrobenzene sulphonyl cyanamides having the following formula:

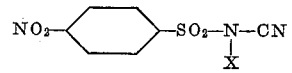

in which X is a member of the group consisting of hydrogen and metals.

2. p-Nitrobenzenesulphonyl cyanamide having the following formula:

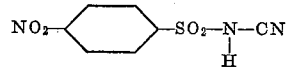

GEORGE W. ANDERSON.
RICHARD O. ROBLIN, JR.